United States Patent [19]

Hedlund et al.

[11] 4,442,465
[45] Apr. 10, 1984

[54] TUNNEL FOR TAPE ACCUMULATION DURING WIND-OFF

[75] Inventors: Lee V. Hedlund, Maple Shade; Jerome D. Shields, Somerdale, both of N.J.

[73] Assignee: RCA Corporation, New York, N.Y.

[21] Appl. No.: 313,314

[22] Filed: Oct. 20, 1981

[51] Int. Cl.³ ............................................. G11B 15/60
[52] U.S. Cl. .................................................. 360/130.23
[58] Field of Search ........... 360/84, 85, 130.22–130.24

[56] References Cited

U.S. PATENT DOCUMENTS 3,912,144 10/1975 Arseneault ..................... 360/84 X
4,357,641 11/1982 Dischert ...................... 360/130.23

Primary Examiner—John H. Wolff
Attorney, Agent, or Firm—E. M. Whitacre; W. H. Meise; L. C. Edelman

[57] ABSTRACT

When tape in a VTR moves in the same direction as the direction of peripheral motion of a headwheel across which the tape passes, release of one end of the tape during rewind may cause the tape to whip around the headwheel and jam. The tape accumulation resulting from the motion is accommodated by a tapered open-ended tunnel. After accumulation in the tunnel, the tape is reeled in by the take-up reel.

4 Claims, 6 Drawing Figures

TUNNEL FOR TAPE ACCUMULATION DURING WIND-OFF

This invention relates to prevention of tape and head damage during rewind in reel-to-reel helical-scan tape recorder/reproducers.

Helical-scan Type-C video recorders (and reproducers) utilize reel-to-reel transport of tape around a scanner or headwheel for transducing signals with the tape. In these systems, the tape is wrapped about the headwheel in an omega fashion, which is a wrap in excess of 180°. The particular problem addressed by this invention relates to a problem which exists when the tape is progressing about the headwheel with longitudinal motion in the same direction as the peripheral motion of the headwheel. When the tape leaves the reel acting as the supply reel under these conditions, or alternatively when the tape leaves the capstan/pinch roller which might hold the tape after it has left the reel, a free end of the tape is produced. The motion of the headwheel then tends to accelerate the low-inertia tape in the direction of tape motion. However, the reel then acting as the take-up reel has a relatively high inertia, and cannot be accelerated at the same rate that the tape accelerates. Consequently, there is a tendency to produce temporary accumulation of tape in some region about the headwheel.

In some prior-art machines, the headwheel is surrounded by dress cover. This dress cover typically includes a flat deck at substantially the height of the top of the headwheel. The dress cover may also include a cylindrical portion substantially coaxial with the cylindrical surface of the headwheel and spaced from the cylindrical surface of the headwheel by a few centimeters. The cylindrical portion of the dress cover often extends about a large portion of the periphery of the headwheel, excepting only those portions near the entrance and exit guides by which the tape is guided onto and from the surface of the headwheel. When the tape comes loose from the reel then supplying the tape in such a prior-art machine, under the conditions described above in which the headwheel rotation is in the direction of tape motion, the tape is pushed by the rotational force imparted thereto by the rotating headwheel into the region near the entrance guide. In order to control the motion of the tape under these conditions, the prior-art machines may include a tape deflector. The tape deflector is located upstream from the tape guide for the described direction of tape motion and projects through the cylindrical wall of the dress cover to within a predetermined distance of the peripheral surface of the wheelhead. This predetermined distance equals only a few thicknesses of the tape. Consequently, when the tape is accelerated as the free end of the tape comes loose from the restraining reel or capstan, the motion of the scanner causes the tape to be accordioned into the region between the cylindrical wall of the headwheel and the cylindrical wall of the dress cover. Since one side of the accordioned tape is in contact with the headwheel, there is a continuing force which urges the tape accumulation against the tape deflector. However, the exit between the tape deflector and the headwheel between the entrance guide and the headwheel is too small to accommodate more than a few thicknesses of tape, and therefore the accordioned tape is intended to flow smoothly past the opening at the tape deflector and passed to the tape guide and thence to the reel then acting as a take-up reel. Unfortunately, the tape deflector as described may fail to prevent multiple thicknesses of tape from attempting to pass through the region between the end of the deflector and the headwheel or between the entrance guide and the headwheel, which results in a jam of the tape. Such jams are most disadvantageous in that the transducer heads of the headwheel may be damaged when they strike the jammed tape. Even if the wedged or jammed tape clears itself, the relatively small radius of curvature of the plate-like tape deflector may cause creasing of the tape, which damages the tape and may contribute to subsequent jams.

An additional problem which results with the prior-art arrangement lies in the fact that the motion of the headwheel imparts to the tape a component of motion which tends to throw the tape in a direction parallel to the axis of rotation of the headwheel. Thus, the component of motion tends to cause the tape to leave the plane of the tape path completely. This direction of motion is not restrained by the described prior art dress cover. On those occasions when the tape actually leaves the plane of the tape path, jamming or folding of the tape inevitably result.

SUMMARY OF THE INVENTION

An improved tape transport arrangement includes a tape supply reel adapted for supplying tape, and a take-up reel adapted for taking up tape from the supply reel. A cylindrical headwheel is disposed in the path of tape extending from the supply to the take-up reels. A peripheral shield extends at least part way about the cylindrical surface of the headwheel and is spaced therefrom. A tape guide arrangement is located near an end of the peripheral shield. The guide arrangement is located at a predetermined distance from the cylindrical surface of the headwheel, and the predetermined distance is of the general order of magnitude of the thickness of the tape. A drive is coupled to the tape for transferring tape from the supply reel to the take-up reel, so that eventually the tape comes loose from the supply reel creating a free end tape. The headwheel is driven for rotating the headwheel for peripheral motion in the direction of the tape motion resulting from the transfer of tape from the supply reel to the take-up reel. When the end of the tape comes free, the rotation of the headwheel imparts to the tape a motion which drives a portion of the tape including the free end of the tape towards the guide arrangement. The motion imparted to the tape causes the tape to accumulate near the guide arrangement whereby it may jam between the guide arrangement and the cylindrical surface of the headwheel. According to the invention, a tunnel is formed in conjunction with the peripheral shield, with the axis of the tunnel projecting away from the surface of the headwheel to provide a location for accumulation of the tape away from the cylindrical surface of the headwheel. The guide arrangement has a smooth curve extending from the tunnel which smooth curve has a radius of curvature much larger than the thickness of the tape.

DESCRIPTION OF THE INVENTION

Figure 1:
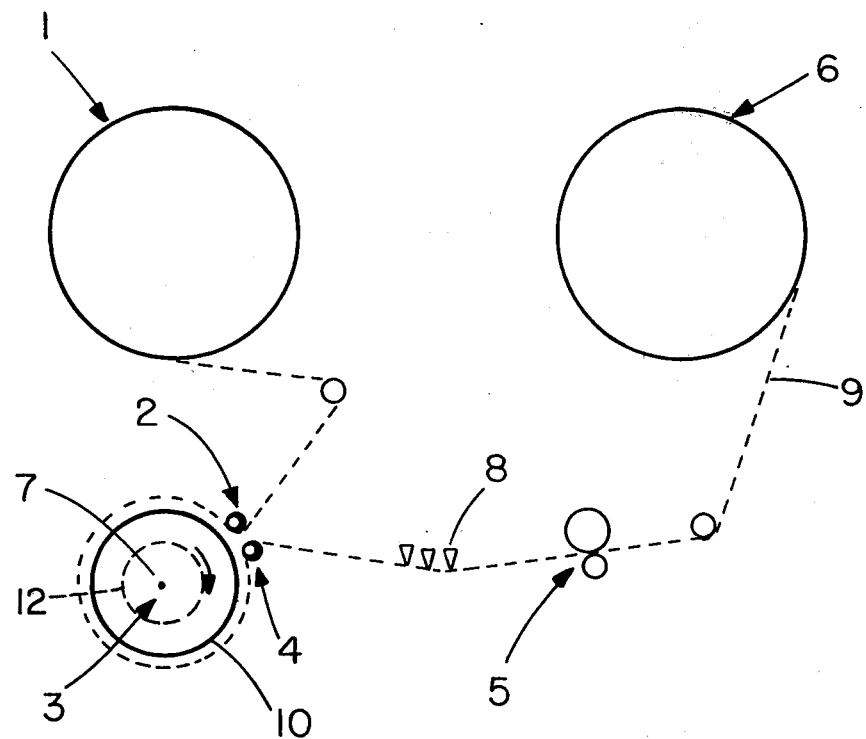
FIG. 1 is a plan view of the tape transport system of a Type-C helical-scan recorder.

The arrangement of FIG. 1 is illustrative of a Type-C helical-scan video tape recorder/reproducer. In FIG. 1, a reel 1 which is the supply reel in the normal forward mode of operation supplies tape illustrated as a dotted line 9 past a roller to an entrance guide 2 which guides the tape onto the desired helical path around the cylindrical periphery 10 of a headwheel or scanner 3 which rotates on an axis illustrated as 7. The headwheel is driven clockwise, the direction shown by the arrow, by a drive means illustrated as 12. The tape spirals about the headwheel along the helical path, and is guided from the headwheel by an exit guide 4. From the exit guide, the tape in the normal or forward direction of operation passes past fixed audio and control-track heads, one of which is illustrated as 8, and passes between a capstan and pinch roller arrangement illustrated as 5 which controls the speed of movement of the tape 9 around headwheel 3 and onto normal take-up reel 6.

Such machines may be operated in reverse, and in a reverse mode of operation, the headwheel continues to rotate in a clockwise direction, but the tape assumes a retrograde motion whereby reel 1 which is normally the supply reel becomes the take-up reel, and reel 6 which is normally the take-up reel then becomes a supply reel.

In the reverse-direction mode of operation it is easy to understand that the tape 9 will eventually come loose from reel 6 after some period of rewind of the tape onto reel 1. Immediately after tape 9 comes loose from reel 6, capstan and pinch roller 5 maintain control of the tape, and control the speed of the tape past headwheel 3 and onto take-up reel 1. After some period of operation in this mode, however, the free end of tape 9 will pass between capstan and pinch roller 5, whereby the speed of motion of the tape is no longer restrained by the capstan and pinch roller.

With the free end unrestrained, two forces tend to accelerate the tape. The first accelerating force is the tension applied to the tape by take-up reel 1 due to the torque imparted thereto by drive motors (not shown). The second force is the force imparted to the tape by rapidly-rotating headwheel 10. At the moment that the free end of the tape is released by the Capstan and pinch roller arrangement, the tape is being pressed against the headwheel by the operating tension. When the free end comes free from the Capstan and pinch roller, a force is imparted to the tape for so long as it is in intimate contact with the peripheral surface 10 of the headwheel, and an additional force will also be imparted to the tape even when it is not in intimate contact with peripheral surface 10, so long as it is within the ambit of the effect of the air in the immediate vicinity of the headwheel, which will also have a rotational velocity. The effect of these forces is to cause a relatively rapid acceleration of the tape which is in the region around the periphery of the headwheel. Since the tape is relatively inelastic, this also results in a rapid acceleration of that portion of the tape between exit guide 4 and the free end of the tape. However, this acceleration is not matched by the acceleration imparted to the tape by reel 1, due to the relatively large inertia of the reel relative to the inertia of the tape. As a result, the tape tends to whip around the headwheel in a clockwise direction from exit guide 4 towards entrance guide 2 faster than the tape is taken from entrance guide 2 towards reel 1. As a consequence, the tape may jam within the relatively narrow passageway formed between the surface of entrance guide 2 and the peripheral surface 10.

In addition to the forces tending to cause an accumulation of tape in the region of entrance guide 2, the direction of the forces imparted to the tape as a result of the helical tape path across headwheel or scanner 3 results in a component of force which is applied to the tape in a direction parallel to axis 7. In other words, the free end of the tape tends to be thrown out of the plane illustrated (that is, the plane of the paper) which further tends to cause jamming.

Figure 2:
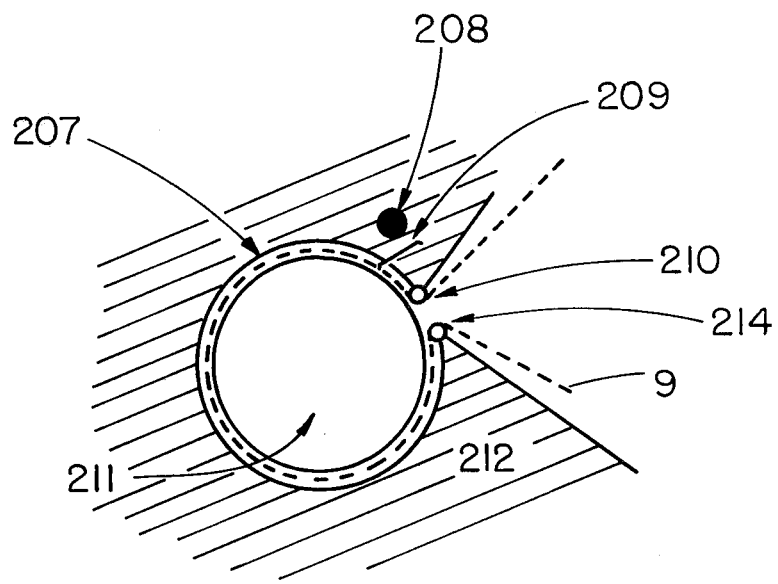
FIG. 2 is a plan view of a portion of a tape transport system near the headwheel of a prior art system.

FIG. 2 illustrates a portion of the tape transport mechanism of the prior art Sony Type-C helical-scan tape recorder. In this machine, a scanner or headwheel 211 has an entrance guide 210 and an exit guide 214 for guiding a tape illustrated as a dotted line 9 about the periphery of headwheel 211. The path taken by tape 9 is shown well separated from the periphery of the headwheel, for clarity of illustration, but it will be clear to those skilled in the art that when tape 9 is under tension, the tape closely hugs the spinning headwheel. In the Sony recorder, the problem of tape accumulation near the entrance guide 210 is exacerbated by a dress cover which includes a plate designated generally as 212 which lies in a plane located roughly near the top of scanner 211. It should be noted that the scanner is tilted slightly with respect to the base plate (not shown) and is somewhat curved so that the exact boundaries of the top are not well defined. In addition to flat plate 212, the dress cover includes a cylindrical shield 207 attached to flat plate 212 and located coaxially with headwheel 211. The cylindrical portion 207 of the dress cover is spaced from the outer periphery of headwheel 211 by a distance on the order of 5 millimeters.

In the arrangement of FIG. 2, with headwheel 211 rotating clockwise and the tape being rewound so that the tape also moves in a clockwise direction about headwheel 211, release the end of the tape causes scanner 11 to accelerate the tape in a clockwise direction as described in conjunction with FIG. 1. However, due to the presence of cylindrical portion 207 of the dress cover, the tape accumulates near entrance guide 210 in the form of an accordion-like arrangement of layers of tape, one edge of which is continuously in contact with the rotating scanner. The edge in contact with the rotating scanner is urged towards entrance guide 210. It is easy to understand that any slight irregularity in the surface of the headwheel, such as for example, the protrusion of the transducing heads, may tend to urge the tape loop adjacent the surface of headwheel 211 into the gap between exit guide 210 and the surface of headwheel 211 before that portion of the tape loop adjacent surface 207. This causes multiple thicknesses of tape to attempt to pass through the separation between the headwheel and the exit guide, which can cause jamming.

In order to attempt a remedy for this problem, a tape deflector 209 is included in the Sony machine. Tape deflector 209 is a metal slab, a portion of which extends into the region between surface 207 of the dress cover and the cylindrical surface of the headwheel. Deflector 209 has a smooth surface and leaves a separation of only a few tape thicknesses through which the tape can pass. The expected effect is to control the flow of the accordioned tape by provision of an extremely narrow passage unsuited to the passage of multiple thicknesses notwithstanding urging by the headwheel. While this arrangement is better than the absence of a deflector, problems can still arise in which tape jams between tape deflector 209 and the surface of the headwheel. It is particularly important to prevent such jamming, because such jamming may cause damage to the transducing heads or to the headwheel. It should be noted that tape deflector 209 and dress cover 207-212 do not prevent the motion of the headwheel from throwing the tape in a direction parallel to the axis of the headwheel when an end of the tape is released.

Figure 3:
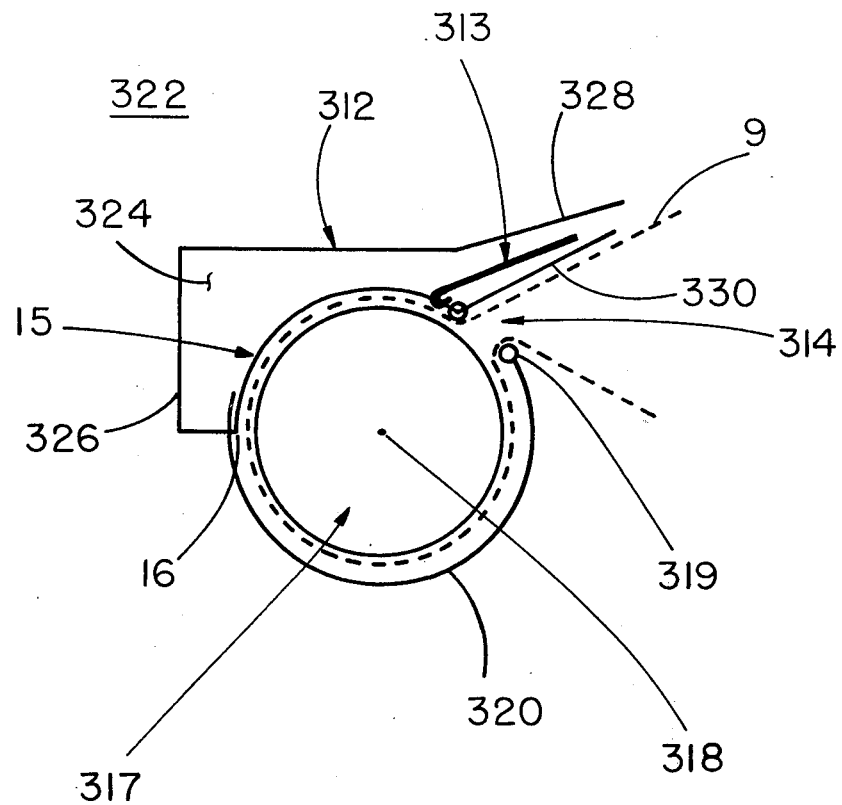
FIG. 3 illustrates a plan view of the headwheel region of a tape transport system according to the invention.

FIG. 3 illustrates an improved cover which provides the function of a dress cover and at the same time substantially improves control of the tape when one end of the tape comes loose during rewind. In FIG. 3, a headwheel 317 rotates about an axis 318. An entrance guide illustrates as 314 guides tape illustrated as a dotted line 9 onto the surface of the headwheel and an exit guide 319 guides the tape from the headwheel. A dress guide 320 is in the form of a portion of the cylinder surrounding the headwheel, much like portion 207 of FIG. 2. However, cover 320 extends only part-way around the scanner. The dress cover for the remainder of the scanner is a box illustrated generally as 322. Dress cover 322 is in the form of an open box, with the opening facing the cylindrical surface of headwheel 317. The top surface 324 of box 322 lies in a plane somewhat below the height of the top of the headwheel. A backwall 312 and a sidewall 326 are additional sides of the box. The bottom of the box may be formed by the baseplate upon which the headwheel and guides are mounted, or it may be a separate piece of metal. In any case, the height of open box 322 in a direction parallel to axis 318 is approximately equal to the width of the tape. Box 322 as may be seen is approximately tapered from surface 326 to the region of entrance guide 314. Within this region, a tapered tunnel is formed in which one sidewall is formed by wall 312 and another sidewall is formed by the surface of scanner 317.

In the region near tape guide 314, the wall of the box is formed by a wall 328. Top surface 324 forms a top for the closed tapered open-ended tunnel having sidewalls 328 and 313. Guide 313 forms the effective wall insofar as the tape is concerned. Deflector 313 also has a curved end near guide 314, which curved end has a relatively large radius of curvature compared with the thickness of the tape.

Figure 4A:
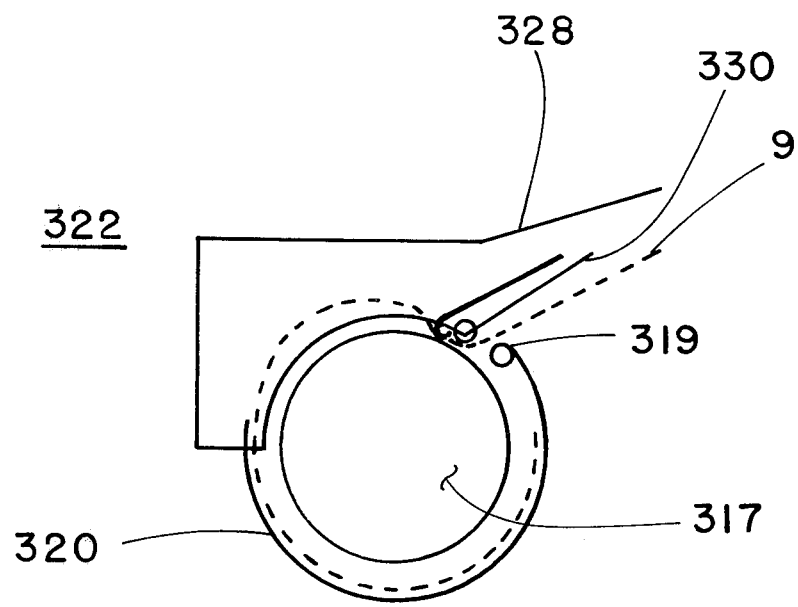
FIG. 4 depicts the same region as does FIG. 3, with different positions of the tape illustrated to aid in understanding the operation of the invention.
Figure 4B:
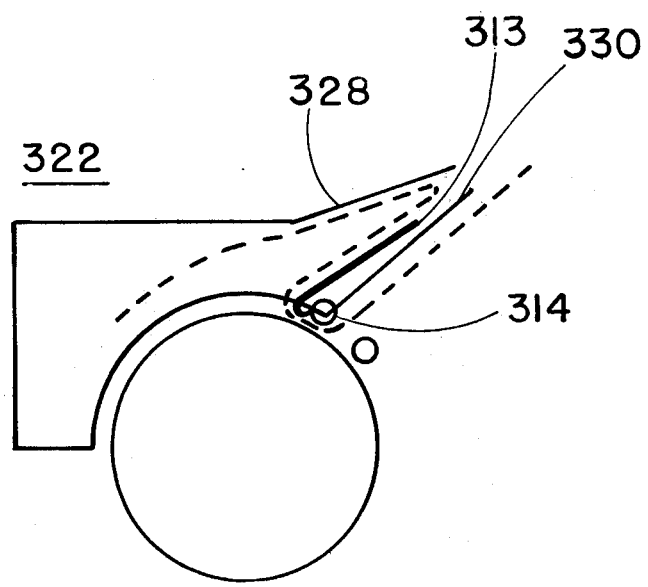
Figure 4C:
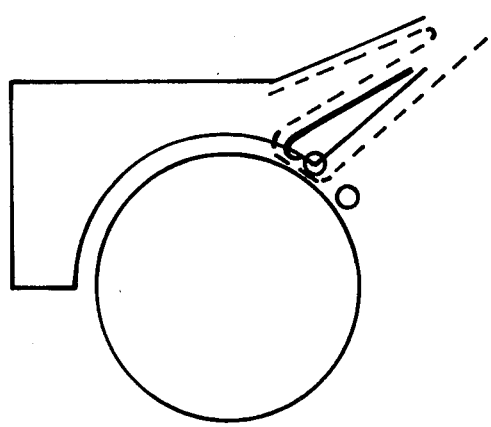

FIG. 4 aids in illustrating the mode of operation of the invention. In FIG. 4a, the position of the tape within box 322 is illustrated at a time a few moments after release of the end of the tape. As can be seen, the tape has been accelerated and is pressed against dress guide 320 over the portions subtended by the dress guide. Within the region of open-ended box 322, tape 9 is billowing into the open-ended box. That portion of the tape within the box is prevented from having any axial motion whatever. Consequently, the possibility of the tape being thrown axially is reduced. In FIG. 4b the billowing motion and the inertia of the accelerated tape have caused the tape to extend itself into the tapered tunned formed between walls 328 and tape deflector 313. In this position, the tape is wrapped about guide 314 and also extends about the curve in the lower portion of deflector 313. Thus, the tape extends about the relatively gentle, large-radius-of-curvature lower end of deflector 313. This prevents damage to the tape as might be occasioned by a plate-type deflector such as illustrated in conjunction with FIG. 2. In FIG. C, it can be seen that the tape has formed a loop, a portion of which protrudes from the open end of the tunnel. It will be understood that the gradual narrowing of the tunnel causes the tape to tend to cling to the sides and to dissipate its motional energy so as to reduce its velocity. However, since the velocity may change from time to time, the exact length which the tunnel must have is indeterminate. To continue narrowing the tunnel past a certain point might cause damage to the tape by causing it to become creased. Hence, the open end allows accommodation of a great variety of conditions.

Naturally, the box and the tunnel should be free of extraneous mechanisms such as mechanism 208 illustrated in FIG. 2.

In an actual embodiment of the invention, the pinch roller/capstan assembly releases the tape at some tape speeds greater than a predetermined windoff speed, whereupon the end of the tape comes loose immediately upon leaving the reel then supplying the tape.

What is claimed is:

1. An improved tape transport arrangement comprising:

a tape supply reel adapted for supplying tape;

a tape takeup reel adapted for taking up tape from said supply reel;

a generally cylindrical headwheel about which said tape is adapted to be disposed for transducing signals therewith;

a peripheral shield extending about at least a portion of the cylindrical surface of said headwheel and spaced therefrom, guide means located near an end of said peripheral shield, said guide means being located at a predetermined distance form said cylindrical surface of said headwheel, said predetermined distance being on the order of magnitude of the thickness of said tape;

drive means coupled to said tape for transferring tape from said supply reel to said takeup reel, whereby said tape will come loose from said supply reel thereby creating a free end of tape;

drive means coupled to said headwheel for rotating said headwheel for peripheral rotation in the direction of said tape motion resulting from said transfer of tape from said supply reel to said takeup reel whereby the rotation of said headwheel imparts to said tape a motion which drives a portion of said tape including said free end of said tape towards said guide means, whereby said motion imparted to said tape may cause said tape to accumulate near said guide means and jam between said guide means and said cylindrical surface of said headwheel;

the improvement comprising:

a tunnel formed of walls which together with the walls of said peripheral shield enclose substantially the entire periphery of said headwheel, the walls of said tunnel defining a tunnel axis projecting away from said cylindrical surface beginning at a location near said guide means and defining a tunnel having a decreasing width with increasing distance from said cylindrical surface to provide a location for accumulation of said tape away from said cylindrical surface of said headwheel; and a smooth curve on the tape-engaging portion of said guide means for guiding tape from said tunnel with a radius of curvature much larger than the thickness of said tape.

2. A tape transport arrangement according to claim 1 wherein said tunnel is open-ended whereby a relatively large accumulation of tape can be accommodated.

3. A tape transport arrangement according to claims 1 or 2 wherein said tunnel has a roughly rectangular cross-section having a relatively constant height in a direction parallel to the axis of said headwheel.

4. A tape transport arrangement according to claims 1 or 2 wherein the axis of said tunnel is skewed relative to a perpendicular to the axis of said headwheel and which is also skewed relative to a tangent to said cylindrical surface of said headwheel.

* * * * *